United States Patent [19]

Giacomazzi et al.

[11] Patent Number: 4,798,306
[45] Date of Patent: Jan. 17, 1989

[54] FUEL TANK VENTING

[75] Inventors: Roy A. Giacomazzi, Washington Township; Rolland D. Giampa, Clarkston, both of Mich.

[73] Assignee: General Motors Corporation, Detroit, Mich.

[21] Appl. No.: 21,765

[22] Filed: Mar. 4, 1987

[51] Int. Cl.[4] ............................................. B01D 53/04
[52] U.S. Cl. .................... 220/86 R; 141/44; 141/286; 137/588; 220/85 VR; 220/85 VS
[58] Field of Search ........... 220/85 VR, 86 R, 85 VS, 220/85 F, DIG. 33, 85 S; 137/587, 588; 141/311 R, 285–310, 392, 44, 45; 55/387, 74

[56] References Cited

U.S. PATENT DOCUMENTS

| | | | |
|---|---|---|---|
| 3,907,153 | 9/1975 | Mutty | 141/59 |
| 4,235,263 | 11/1980 | Lake | 141/285 |
| 4,572,394 | 2/1986 | Tanahashi et al. | 220/86 R |
| 4,610,284 | 9/1986 | Bartholomew | 141/302 |
| 4,630,749 | 12/1986 | Armstrong et al. | 220/86 R |
| 4,701,198 | 10/1987 | Uranishi et al. | 55/387 |
| 4,706,708 | 11/1987 | Fornuto et al. | 137/588 |
| 4,707,164 | 11/1987 | Harris | 220/85 VR X |
| 4,714,172 | 12/1987 | Morris | 220/86 R |
| 4,747,508 | 5/1988 | Sherwood | 220/86 R |

Primary Examiner—Henry J. Recla
Assistant Examiner—Ernest G. Cusick
Attorney, Agent, or Firm—Patrick M. Griffin

[57] ABSTRACT

Both puff losses and fuel fill vapor losses are recovered by a venting arrangement that includes a vapor storage canister connected fitting opening through the upper end of a filler pipe valve, a valve downstream from the fitting, and a seal upstream from the fitting. A cap extension holds the valve closed, and also wipingly engages the seal. When the cap is removed, the valve is opened, but the seal stays engaged until the cap is fully removed and the extension fully withdrawn, so that puff loss vapors are directed out through the fitting to the storage canister. When the fuel nozzle is inserted, it wipingly engages the same seal, so that fuel fill vapors are similarly recovered.

3 Claims, 2 Drawing Sheets

FUEL TANK VENTING

BACKGROUND OF THE INVENTION

1. Field of the Invention

This application relates to fuel tank venting in general, and specifically to a fuel tank venting means that is designed to control what are commonly known as "puff losses".

2. Description of the Related Art

Motor vehicle fuel vapor emission standards have been in effect for some time, and are becoming increasingly stringent. Originally, evaporative emission control efforts were directed at preventing the loss to the atmosphere of fuel vapors emitted from the carburetor and the loss of fuel vapors generated in the fuel tank. The typical evaporative emission control system that arose from such efforts, which is commonly used in production today, includes a vapor storage canister charged with activated absorbent charcoal pellets. The carburetor and fuel tank are both connected to the canister through various arrangements of hoses and control valves. Current work is aimed as well at recovering the raw hydrocarbons lost to the atmosphere while the fuel tank is being filled. Several designs have been proposed and used to recover both the vapors generated from the fuel dispensing nozzle itself as well as the vapors displaced from the tank and up the filler pipe by the entrance of the fuel. Various arrangements of hoods and vent lines have been used to direct such fuel fill vapors away from the atmosphere and to the vapor storage canister. A lesser, though not inconsiderable, vapor loss is the pressurized tank vapors that exit almost immediately to the atmosphere through the upper end of the fuel tank filler pipe when the gas cap is first removed. This loss has come to be called a "puff loss" due to the distinctive popping sound that occurs as the cap is removed, which is most noticeable on a hot day.

The vent system disclosed in the U.S. Pat. No. 4,572,394 to Tanahashi et al purports to deal with puff losses, but in a very impractical manner. As there disclosed, an additional canister would be provided surrounding the filler pipe itself. The removal of the gas cap would allow a bellows held within a large cone shaped upper end of the filler pipe to shift, purportedly quickly enough to simultaneously block off the upper end of the filler pipe and also direct puff loss vapors into the additional canister. The room taken by, and the added expense of, the extra canister, as well as the radical departure from conventional filler pipe design, make the system highly undesirable. U.S. Pat. No. 4,630,749 to Armstrong et al, assigned to the assignee of the present invention, controls fuel vapors with the storage canister of a conventional evaporative emission control system. The venting means there disclosed has a flapper door that engages an annular seal located below the cap, but upstream of a canister connected fitting that opens to the filler pipe. The fitting opening is normally closed by a spring loaded ball valve. Just after cap removal, the flapper door is still closed on the seal to prevent puff loss at that point. The flapper door does not open until the fuel nozzle is inserted to push it open, but, before the nozzle opens the flapper door, it passes through the annular seal, creating a new barrier to the puff loss. As the flapper door is pushed open, a projection on it in turn opens the ball valve to open a path for the pressurized fuel vapors, both the puff loss vapors and fill vapors that occur during the fuel fill operation. In this design, the control of puff losses depends on the engagement of the seal with a properly sized fuel nozzle. Absent that, an opening would be created to the atmosphere as soon as the flapper door was pushed open. While the flapper door would generally be pushed open only by such a properly sized nozzle, it is possible that it could be opened by a too small nozzle, or by some object other than a nozzle, as when the operator was adding something other than nozzle dispensed fuel to the fuel tank. Puff losses would not be controlled under those circumstances.

SUMMARY OF THE INVENTION

The invention provides a vent means for puff loss control that operates independently of fuel nozzle insertion, activated by cap removal alone. The invention provides such a venting means in a practical embodiment that uses the current vapor storage canister of a typical evaporative emission control system, without radically altering the shape or size of the fuel tank's filler pipe. In the preferred embodiment disclosed, vapors generated during the fill operation itself are also recovered by the same venting means.

The preferred embodiment of the invention is disclosed in a vehicle fuel system having a fuel tank with an essentially conventional filler pipe having an upper end closable by a removable cap. After cap removal, the upper end of the filler pipe is opened to the atmosphere and a conventional cylindrical fuel dispensing nozzle is inserted therein for fuel fill. A conventional fuel vapor storage canister is connected to the tank as part of the evaporative emission control system.

A valve is located inside the filler pipe downstream from its upper end, and is spring biased to move upwardly from a closed position blocking the filler pipe to an open position. When the valve is closed, both liquid fuel and vapors are prevented from flowing past it, although both may flow past it when open. A fitting opens through the filler pipe intermediate the valve and the filler pipe upper end, which is in turn connected by a hose to the vapor storage canister.

The cap, which is threaded into and out of the upper end of the filler pipe in conventional fashion, also includes a cylindrical extension on its underside that is sufficiently long to hold the valve closed when the cap is in place. When the cap begins to turn as it is removed, the extension begins moving up, allowing the valve to spring up to its open position, unblocking the filler pipe. The filler pipe also has an O-ring type seal located intermediate the upper end of the pipe and the fitting and sized so as to surround and wipingly engage the cap extension. In the preferred embodiment, the cap extension also has a diameter substantially equal to the fuel dispensing nozzle, so the same seal may also wipingly engage the nozzle.

When the cap is in place, pressurized fuel vapors in the tank are prevented by the closed valve from reaching the atmosphere and also prevented from reaching the fitting. When the cap begins to be removed, the valve is allowed to open. The pressurized fuel vapors are prevented from reaching the atmosphere by the O-ring wiping on the cap extension, and are directed instead through the fitting to the canister. Therefore, puff loss vapors are controlled simply by virtue of removing the cap, and will be substantially dissipated to the canister by the time the cap has been fully removed and the cap extension fully withdrawn from the O-ring.

In addition, when and if a fuel nozzle is inserted for fuel fill after cap removal, then the seal wipingly engages the fuel nozzle as well so that fuel fill vapors are prevented from reaching the atmosphere and are directed through the fitting to the canister.

It is, therefore, a broad object of the invention to provide a venting means to recover puff losses that operate by virtue of cap removal alone, independent of fuel nozzle insertion, and which does so using the already existing storage canister of a conventional evaporative emission control system.

It is another object of the invention to additionally control fuel fill vapor loss with the same venting means.

It is yet another object of the invention to provide such a venting means that includes a fitting opening through a filler pipe with an openable and closable valve downstream of the fitting, and with a wiping seal upstream of the fitting, with an extension on the cap that both wipingly engages the seal and holds the valve closed until the gas cap begins to be removed, with the wiping seal continuing to engage the extension until the cap is fully removed so that puff vapors are blocked from the atmosphere and directed through the fitting to the storage canister.

It is still another object of the invention to provide such a venting means in which the wiping seal also engages the fuel dispensing nozzle after it has been inserted so that fuel fill vapors from the nozzle can be controlled by the same structure.

BRIEF DESCRIPTION OF THE DRAWINGS

These and other objects and features of the invention will appear from the following written description and from the drawings, in which.

DESCRIPTION OF THE PREFERRED EMBODIMENT

Figure 1:
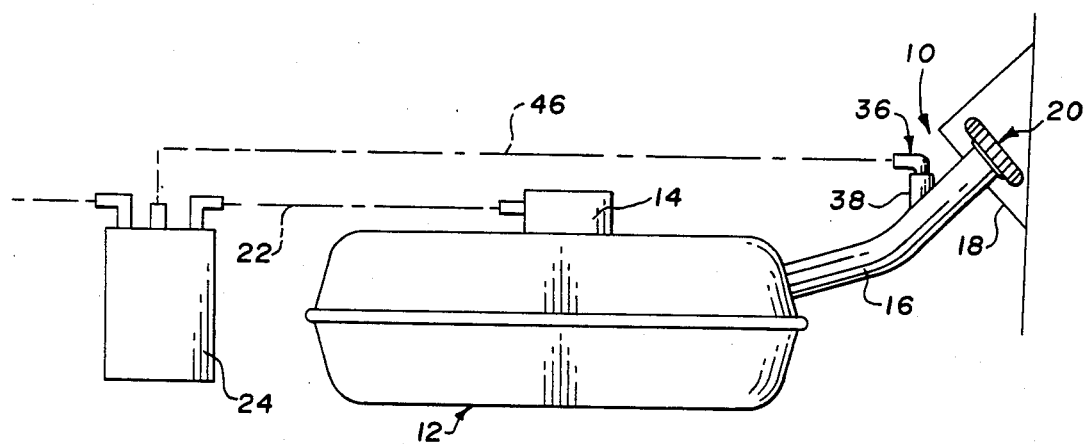
FIG. 1 is a schematic view of a vehicle fuel tank and evaporative emission control system incorporating the invention.
Figure 4:
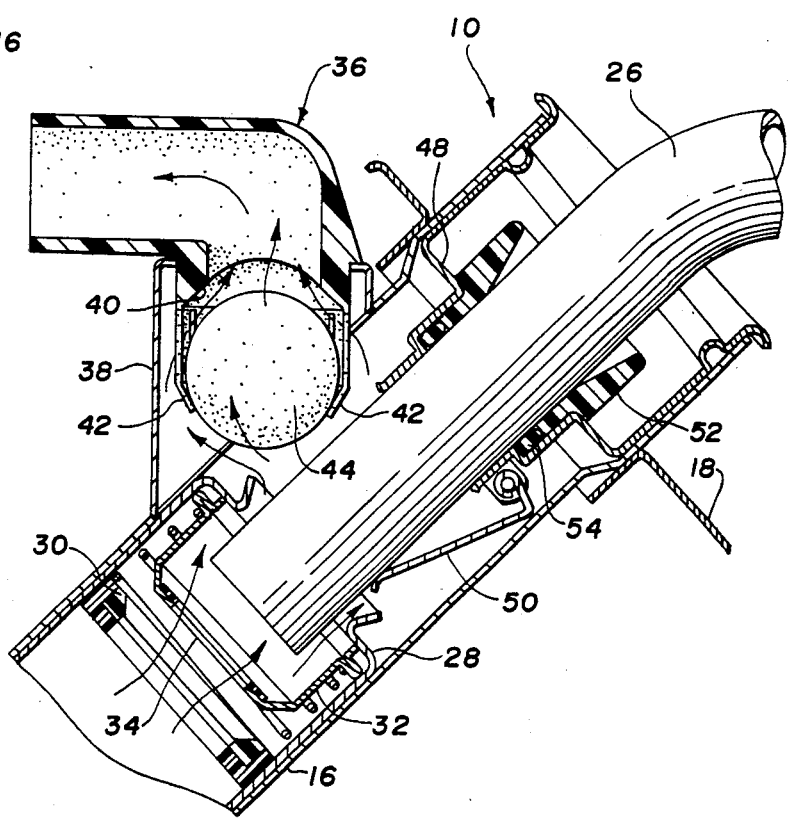
FIG. 4 is a view similar to FIG. 3, but showing the cap fully removed, and showing the fuel dispensing nozzle in place.

Referring first to FIGS. 1 and 4, the preferred embodiment of the venting means of the invention, designated generally at 10, is used in conjunction with a conventional vehicle fuel system having a fuel tank, designated generally at 12. Fuel tank 12 has a vapor dome 14 at the top, and a conventionally sized filler pipe 16. Filler pipe 16 is supported at its upper end to the vehicle body by a support flange 18, and is closed by a removable cap designated generally at 20. While cap 20 is in place, pressurized fuel vapors will naturally form in tank 12, some of which will collect in dome 14. Vapors from dome 14 are carried by a hose line designated schematically at 22 to a conventional vapor storage canister 24, rather than just venting tank 12 to the atmosphere. A separate tank pressure control valve, not shown, would allow air to enter or leave tank 12 to compensate for the volume of fuel entering or leaving. There is a practical limit to how much vapor can be collected by canister 24 through hose line 22. Therefore, some pressurized fuel vapor will inevitably collect and rise in filler pipe 16, exiting to atmosphere when cap 20 is removed. These vapors constitute the so-called puff loss, and are most evident on a warm day. Also, when fuel is dispensed from the typical cylindrical nozzle 26, fuel vapors are produced both from the nozzle 26 itself, and the air vapor mixture in the tank is displaced from the tank 12 as the fuel enters. These fill vapors would exit out the end of filler pipe 16 to the atmosphere without some control measure. The venting means of the invention 10 provides both puff loss control and fuel fill vapor control, using the already present canister 24, with little alteration to filler pipe 16.

Figure 2:
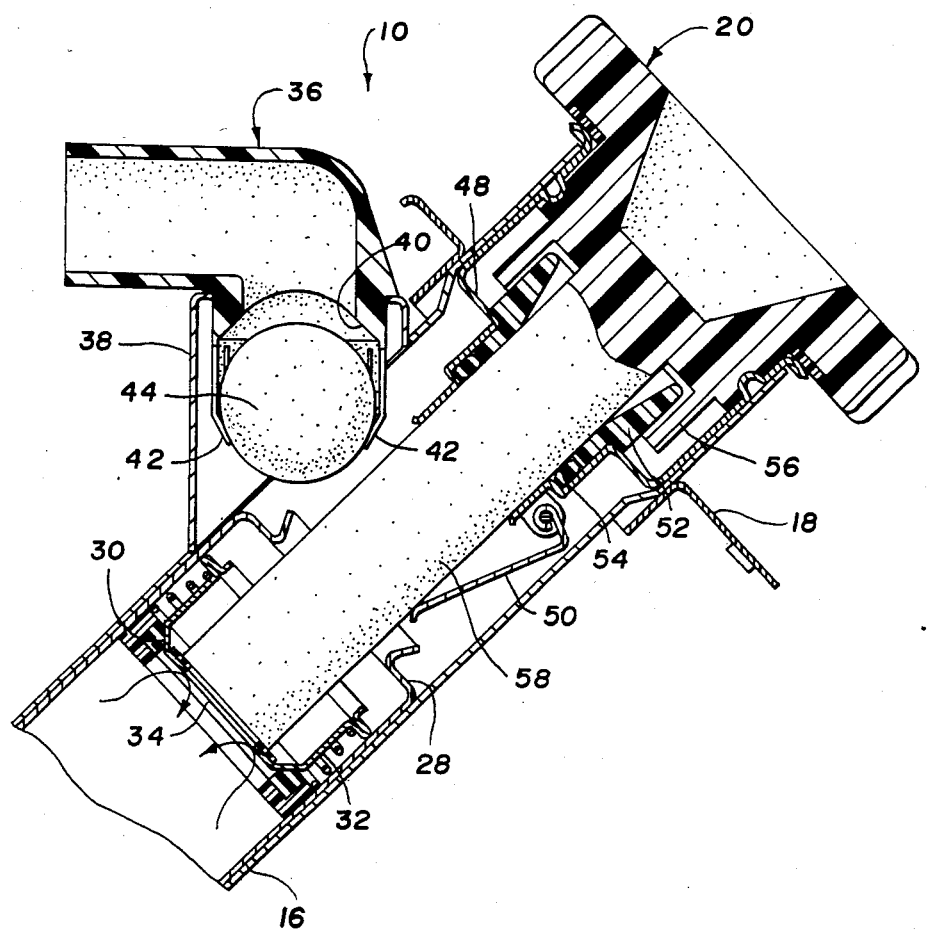
FIG. 2 is an enlarged sectional view of the top of the fuel tank filler pipe showing the preferred embodiment of the venting means of the invention when the cap is in place.
Figure 3:
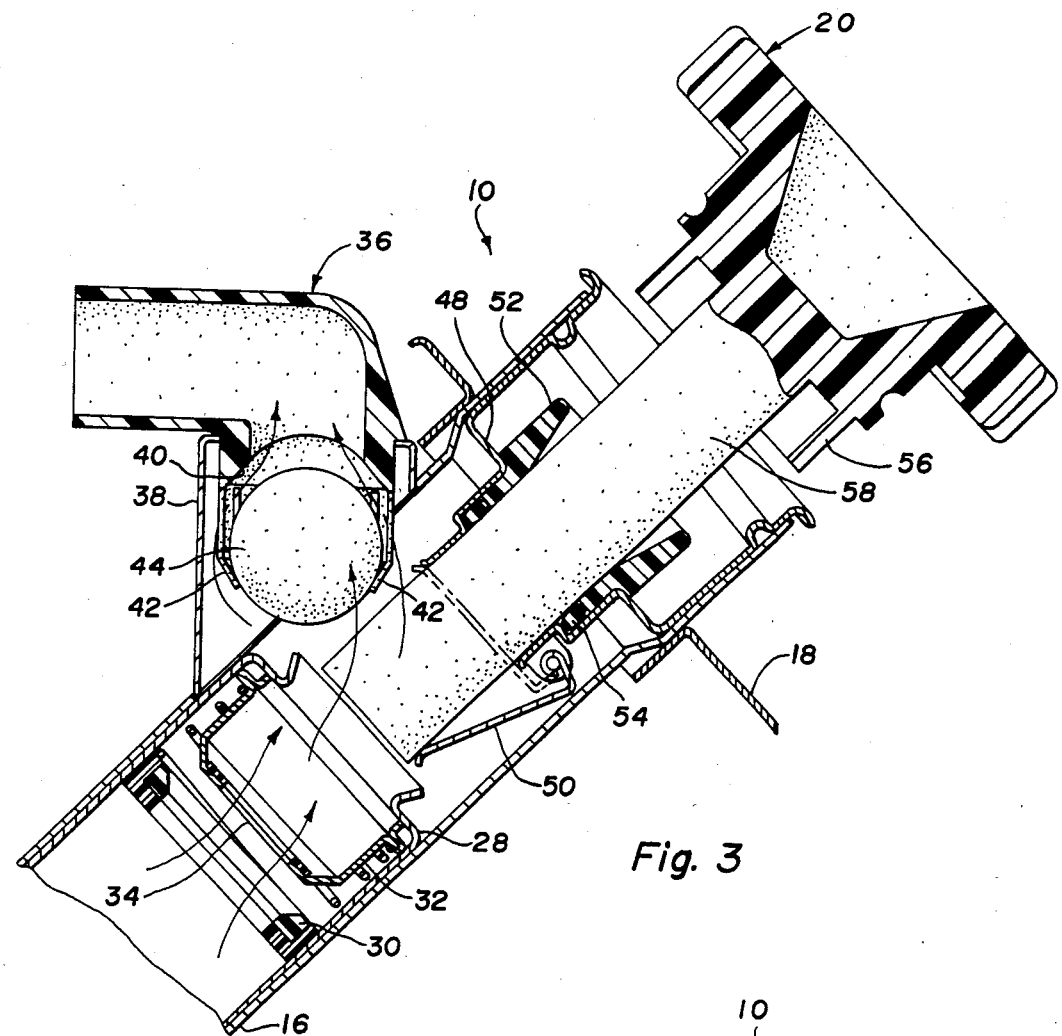
FIG. 3 is a view similar to FIG. 2, but showing the cap in the, process of being removed.

Referring next to FIGS. 2 and 3, filler pipe 16 is formed of sheet metal in a conventional size and cylindrical shape. A pressed-in lower cylindrical metal insert 28 supports an annular valve seat 30 downstream from the upper end of filler pipe 16. A valve 32, stamped of metal in a generally cylindrical shape with a central opening 34, is spring loaded between the valve seat 30 and the top of insert 28. It will be understood that if opening 34 is covered and valve 32 is held down against seat 30, as shown in FIG. 2, filler pipe 16 will be blocked to the flow of either fuel or fuel vapor. This may be conveniently referred to as the closed position of valve 32. Conversely, if the central opening 34 is uncovered and valve 32 allowed to spring upwardly, which may be referred to as the open position, filler pipe 16 will be open to the passage of both fuel and vapors, as shown in FIG. 3. The means that so actuates valve 32 will be described below. An L-shaped fitting molded of plastic or other suitable material, designated generally at 36, is plugged onto a metal adapter sleeve 38 and thereby opens to the interior of filler pipe 16 at a point intermediate the valve 32 and the upper end of filler pipe 16. Fitting 36 defines a partially spherical seat 40 and depending fingers 42 hold a float ball 44 beneath seat 40. Float ball 42 falls normally from the force of gravity, so that fitting 66 is normally open, but, should fuel rise sufficiently high within filler pipe 16, float ball 44 is pushed up against seat 40, closing off fitting 36. Fitting 36 is connected by a hose line designated schematically at 46 to canister 24.

Referring now to FIG. 2, an upper insert 48 stamped of sheet metal in a stepped cylindrical shape is pressed down into the upper end of filler pipe 16, to serve several purposes. Insert 48 is threaded so that cap 20 can be turned into and out of it, and a conventional flapper door 50 is pivoted thereto to prohibit the introduction of improper fuel. Insert 48 also mounts a lead-in shoulder 52 and an annular elastomer O-ring 54. Although not illustrated, a conventional overflow relief valve could be added to insert 48. Cap 20, which is molded of plastic, is attached and removed in basically conventional fashion, but is molded with a depending wall 56 and a cylindrical extension 58 on its underside. Wall 56 surrounds the lead-in shoulder 52 with some radial clearance, while extension 58 has a diameter sufficiently large to wipingly engage O-ring 54. In the preferred embodiment, the diameter of extension 58 is also chosen to be substantially equal to the diameter of the fuel dispensing nozzle 26, for a purpose described below. Extension 58 is sufficiently long to hold the valve 32 down in its closed position and to cover central opening 34 when the cap 20 is in place, as seen in FIG. 2. Vapors attempting to move up filler pipe 16 are thereby blocked, as shown by the arrows in FIG. 2. Valve 32 thus provides protection against liquid fuel moving up filler pipe 16, as well. The extension 58 also holds flapper door 50 open, but this presents no problem, as door 50 will close before it is needed, as will appear below. Thus, it may be seen that the construction of the invention is relatively uncomplicated, involving only the press fitting of two inserts, 28 and 48, within a conventionally sized filler pipe 16 and the attachment of the fitting 36. Inserts 28 and 48 may be separately built up as subassemblies with the components mounted to them, which is a practical advantage. Cap 20 may be easily molded, despite the extension 58. Fitting 36 and float ball 44 are also relatively small, and easily assembled, and conventional canisters like 24 already have enough ports for the number of hoses involved. Thus, the invention may be easily used with conventional vehicle fuel systems and evaporative emission control systems. The operation of the invention will be described below.

Referring now to FIGS. 3 and 4, when the cap 20 begins to turn as it is removed, the extension 58 begins moving up, allowing the valve 32 to spring up to its open position as central opening 34 is uncovered, unblocking the filler pipe 16. As cap 20 is being removed, extension 58 remains in wiping sealing engagement with O-ring 54 until fully withdrawn and vapors are thereby blocked from exiting filler pipe 16 to the atmosphere. The blocked vapors exit through fitting 36 and hose line 46 to be absorbed by canister 24, as is shown by the arrows of FIG. 3. By the time cap 20 has been fully removed and extension 58 fully withdrawn, these vapors will have been largely recovered by the canister 24. Although not shown, it will be understood that flapper door 52 will spring closed as extension 58 is withdrawn, whereupon it may perform its standard function of inhibiting the introduction of leaded fuel. It will be understood at this point that the puff loss control so provided is dependent upon and activated by the removal of cap 20 alone. Generally, the next step will be the insertion of the fuel nozzle 26 and the dispensing of fuel in the fill operation, but even if that is not true, the puff loss has been controlled. In the embodiment disclosed, when nozzle 26 is inserted, it is guided by lead-in shoulder 50 into wiping engagement with O-ring 54, as shown in FIG. 4, just as extension 58 was. Nozzle 26 is not long enough to push valve 32 closed, and fuel from nozzle 26 can pass through valve opening 34 an the valve seat 30 to tank 12. Fuel fill vapors generated from either nozzle 26 itself, or from the displacement of air-vapor mixture from tank 12, are thereby also prevented from reaching the atmosphere. These fuel fill vapors can, however, easily exit through fitting 36 to the canister 24, as shown by the arrows. Thus, the same structure that controlled puff loss independent of the insertion of the fuel nozzle 26 is also made to work in cooperation with nozzle 26 to also control fuel fill vapors. This is an additional and essentially cost-free advantage of the invention, since the already existing canister 24 is used.

Variations of the preferred embodiment may be made within the spirit of the invention. Nozzle 26 need not be engageable with O-ring 54 to recover the puff loss vapors, as has been explained. Other types of valves and valve actuating structures could be used, so long as the basic spatial arrangement of valve 32, fitting 36, and O-ring 54 was maintained. Float ball 44 is not absolutely necessary to vapor recovery, but does not interfere with it, and the overfill protection it provides is desirable. An additional hose line could be run from dome 14 through filler pipe 16 below valve 32, if desired, to provide another path for the recovery of vapors displaced from tank 12 during the fill operation. Therefore, it will be understood that it is not intended that protection be limited to just the preferred embodiment disclosed.

The embodiments of the invention in which an exclusive property or privilege is claimed are defined as follows:

1. In a vehicle fuel system having a fuel tank with a filler pipe having an upper end closable by a removable cap, said upper end opening to the atmosphere when said cap is removed, said system also having a fuel vapor storage canister to which said fuel tank is connected, a venting means that prevents pressurized fuel vapors generated in said tank when said filler pipe is closed from reaching the atmosphere as said cap is removed, said venting means comprising, a valve located inside said filler pipe downstream from said filler pipe upper end, said valve being movable from a closed position blocking said filler pipe to an open position, a fitting opening through said filler pipe intermediate said valve and said upper end, said fitting being connected to said vapor storage canister, valve actuation means on said cap adapted to hold said valve in its closed position when said cap is in place and to allow said valve to move to its open position as said cap begins to be removed, and seal means engageable with said cap intermediate said fitting and said filler pipe upper end, said seal means remaining engaged with said cap after said valve opens and as said cap is removed until said cap is fully removed, whereby when said cap is in place, said pressurized fuel vapors are prevented by said valve from reaching the atmosphere and also prevented from reaching said fitting, whereas when said cap begins to be removed, said valve is allowed to open and said pressurized fuel vapors are prevented from reaching the atmosphere by said seal means, and are directed instead through said fitting so as to be substantially stored in said canister by the time said cap is fully removed and said filler pipe opened to the atmosphere.

2. In a vehicle fuel system having a fuel tank with a filler pipe having an upper end closable by a removable cap, said upper end opening to the atmosphere when said cap is removed to receive an inserted fuel dispensing nozzle, said system also having a fuel vapor storage canister to which said fuel tank is connected, a venting means that prevents pressurized fuel vapors generated in said tank when said filler pipe is closed from reaching the atmosphere as said cap is removed and which also prevents fuel vapors generated during fuel dispensing from reaching the atmosphere, said venting means comprising, a valve located inside said filler pipe downstream from said filler pipe upper end, said valve being movable from a closed position blocking said filler pipe to an open position, a fitting opening through said filler pipe intermediate said valve and said upper end, said fitting being connected to said vapor storage canister, valve actuation means on said cap adapted to hold said valve in its closed position when said cap is in place and to allow said valve to move to its open position as said cap begins to be removed, and seal means engageable with said cap intermediate said fitting and said filler pipe upper end, said seal means remaining engaged with said caps after said valve opens and as said cap is removed until said cap is fully removed, said seal means also being engageable with said dispensing nozzle when it is inserted, whereby when said cap is in place, said pressurized fuel vapors are prevented by said valve from reaching the atmosphere and also prevented from reaching said fitting, whereas when said cap begins to be removed, said valve is allowed to open and said pressurized fuel vapors are prevented from reaching the atmosphere by said seal means and are directed instead through said fitting so as to be substantially stored in said canister by the time said cap is fully removed and said filler pipe opened to the atmosphere, with the seal means then engaging said dispensing nozzle as it is inserted so that fuel vapors generated during fuel dispensing are thereby prevented from reaching the atmosphere and directed through said fitting to said canister.

3. In a vehicle fuel system having a fuel tank with a filler pipe having an upper end closable by a removable cap, said upper end opening to the atmosphere when said cap is removed to receive an inserted cylindrical fuel dispensing nozzle, said system also having a fuel vapor storage canister to which said fuel tank is connected, a venting means that prevents pressurized fuel vapors generated in said tank when said filler pipe tube is closed from reaching the atmosphere as said cap is removed and which also prevents fuel vapors generated during fuel dispensing from reaching the atmosphere, said venting means comprising, a valve located inside said filler pipe downstream from said filler pipe upper end, said valve being biased to move from a closed position blocking said filler pipe upwardly to an open position, a fitting opening through said filler pipe intermediate said valve and said upper end, said fitting being connected to said vapor storage canister, a cylindrical extension on said cap sufficiently long to hold said valve down in its closed position when said cap is in place, said valve moving to its open position as said cap begins to be removed and said extension is moved upwardly, said extension further having a diameter matching said dispensing nozzle, and a seal located intermediate said fitting and said filler pipe upper end and sized so as to surround and wipingly engage said cap extension, whereby when said cap is in place, said pressurized fuel vapors are prevented by said valve from reaching the atmosphere and also prevented from reaching said fitting, whereas when said cap begins to be removed, said valve is allowed to open as said cap extension moves upwardly and said pressurized fuel vapors are prevented from reaching the atmosphere by said seal and are directed instead through said fitting so as to be substantially stored in said canister by the time said cap has been fully removed and said extension has been withdrawn from said seal to open said filler pipe to the atmosphere, with the seal then wipingly engaging said dispensing nozzle as it is inserted so that fuel vapors generated during fuel dispensing are thereby prevented from reaching the atmosphere and directed through said fitting to said canister.

* * * * *